United States Patent Office 3,836,686
Patented Sept. 17, 1974

3,836,686
RECOVERY OF PROTEIN HYDROLYSATE FROM FISH OR FISH PRODUCTS
Oswald A. Roels, Demarest, N.J. 07627
No Drawing. Continuation of abandoned application Ser. No. 126,358, Mar. 19, 1971. This application Oct. 27, 1972, Ser. No. 301,371
Int. Cl. A23j 1/04
U.S. Cl. 426—376                    2 Claims

ABSTRACT OF THE DISCLOSURE

A process for recovering a protein hydrolysate from whole fish or fish products, such as, for example, fish meal comprising digesting a homogenized slurry of the fish at elevated temperature in an acid medium at a pH of about 1 and separating and purifying the aqueous phase of the digestion step; the protein hydrolysate resulting from the aforedescribed procedure being extremely low in fish oil content and consequently more palatable and resistant to spoilage.

---

This is a continuation of application Ser. No. 126,358, filed Mar. 19, 1971, now abandoned.

DISCLOSURE OF THE INVENTION

Recovery of the protein content of fish, whole or that portion remaining after the conventional saleable parts are removed, or fish products, in a stable and palatable form normally involves a digestion of the fish in subdivided form in an acid or neutral medium at elevated temperature and pressure followed by a separation of the resulting layers from the digestion step and subsequent concentration; including in some processes a further treatment to remove acid and/or salt contaminants.

Heretofore, the processes for recovering the protein content have produced a product having a substantial percent of residual fish oil. For example, the process described in U.S. Pat. No. 2,589,287, produces a so-called "liquid fish" product having an oil concentration of approximately 5–10% based on the dried solid content of protein (N×6.25), oil and ash.

Surprisingly, it has been found that conducting the digestion at a pH of about 1, followed by separation and purification of the resulting aqueous phase will yield a protein hydrolysate having a concentration of oil of less that 0.15%; yet obtaining a high recovery of the original protein content.

At pH of 0.5 to 1.5 a recovery in excess of 50% of the protein value present in the originally treated product was obtained. At pH 1.5 the oil content was 0.12% and at pH 0.5 the oil content was below 0.1%.

In general, the process comprises digesting finely subdivided fish or fish products at a pH of about 1. Preferably hydrochloric acid or sulphuric acid is used. When the mass is at the proper pH, it is then subjected to elevated temperature. A super-atmospheric pressure may be used. A temperature of 120° C. and pressure of 15 p.s.i.g. for a period of 15 minutes has been found suitable though a range of temperature, pressure and period of treatment may be employed.

When whole fish or a residue thereof is used, subdivision may be attained by grinding and macerating the fish in an aqueous medium, usually but not necessarily containing an appropriate amount of antioxidant and preferably in an inert atmosphere.

If desired, when whole fish is employed, the grinding and maceration step may be followed by a separation, such as, centrifugation, to remove bones and scales, the supernatant liquid being comprised mainly of water, protein and fish oil. Alternatively, the precipitate from this separation (bones and scale) may be subjected to an aqueous extraction to remove further amounts of protein and oil. The supernatants from each of the separations may be combined and treated as described above.

Following acid digestion the mass may be cooled, if desired, and the resulting insoluble material, usually a flocculent solid, is separated from the subnatant liquid, for example, by skim-centrifugation or filtration. If the bones have not been removed, they may settle as a bottom layer.

The acidity of the liquid phase, containing dissolved protein hydrolysate, may then be neutralized by the addition of base or preferably by passing through a suitable ion exchange medium to the desired pH.

If it is desired to recover the protein hydrolysate in solid form, the neutralized liquid may be subjected to a drying step, e.g., spray drying.

The product resulting from the drying step is usually pale yellow to brown. The product may be further decolored by passing the neutralized aqueous protein solution, preferably before drying, through a charcoal adsorption or ion exchange.

An oil and mineral product may be obtained as by-products of the aforedescribed process. The oil may be refined by procedures such as solvent extraction, heating and pressing or other methods known to those skilled in the art.

The mineral product is obtained by subjecting the precipitate from the first centrifugation step, which precipitate consists mainly of bones and scale, to an acid treatment under elevated temperature and pressure. Examples of suitable acids are hydrochloric and sulfuric.

A further feature of this invention is the direct preparation of a protein hydrolysate having a dietetically useful mineral content, particularly with respect to the elements calcium and phosphorus. In experiments on Peruvian fish meal, the mineral content of the protein hydrolysate prepared by heating at 121° C. for 15 minutes at pH 1, was respectively, 16.3 and 16.4% when resin IRA 93 (described hereafter) was used; and 18.0 and 19.2% when resin IRA 68 (described hereafter) was used. This may be favorably compared with the mineral content of the original Peruvian fish meal, which was 14.1% on a dry weight basis.

To prepare a mineral-rich protein hydrolysate from whole fish the solids resulting from the initial grinding and maceration are not removed but are subjected along with the liquid to the acid treatment at about pH 1. During this step a substantial quantity of the mineral content will dissolve in the liquid and be retained therein until the drying step. Undissolved solids remaining after the acid treatment may be removed during the oil separation step.

The invention may be further illustrated by reference to the following examples.

EXAMPLE I

1. Disintegration

Two hundred and forty grams of fresh herring having the following composition:

|  | G. |
|---|---|
| Water | 188.2 |
| Oil | 8.8 |
| "Crude Protein" (total nitrogen×6.25) | 35.8 |
| Ash (prepared at 650–700° C.) | 5.54 |
| Unidentified components | 1.66 | were mixed with 480 ml. of deionized water and 0.5 g. of butylated hydroxy anisole in a high speed blender for 8 minutes under a nitrogen atmosphere.

2. Separation of Liquids and Solids

The mass from (1) was centrifuged in an angle rotor at a relative centrifugal force varying from 2000–5000 times gravity for five minutes. At the end of centrifugation, the supernatant liquid was decanted. After the addition of 240 ml. of deionized water, the precipitate was again subjected to the blending of step (1) for a period of two minutes and then subjected to centrifugation and the supernatant separated. The supernatant layers from each centrifugation were combined and subjected to an acid treatment as more fully described hereafter.

The precipitate analyzed as follows:

|   | G. |
|---|---|
| Ash | 2.4 |
| Crude Protein | 3.9 |
| Oil | 0.2 |
| Unidentified Material | 0.2 |

3. Acid Treatment

To the combined supernatant liquid was added 206 ml. concentrated hydrochloric acid (38%) to achieve a final concentration of 3 N hydrochloric acid. The pH of the mass was less than 1. The mass was heated at 120° C., at a steam pressure of 15 lbs./sq. in. for 60 minutes. Following this, the mass was cooled to room temperature. At room temperature two phases appeared, one a clear liquid and the other a flocculent solid floating in the liquid. The mass was filtered through a Whatman No. 12 filter paper to separate the liquid and solid. The solid (filter cake) was repeatedly washed with deionized water to remove the excess acid and filtered; the filtrates being combined with the initial filtrate and subjected to an ion exchange treatment as described below.

The filter cake analyzed as follows:

|   | G. |
|---|---|
| Oil | 8.6 |
| Crude Protein | 0.9 |
| Ash | 0.04 |
| Unidentified Material or loss | 0.36 |

4. Ion Exchange Treatment

The filtrates from the acid treatment step were passed through a bed of a weak base anion exchange resin, namely Amberlite IRA–93, produced by Rohm & Haas, Philadelphia, Pa., for the purpose of removing any residual hydrochloric acid and to further purify the product.

As reported in the Rohm & Haas Bulletin IE–106–66, December 1966, Amberlite IRA–93 is a macroreticular, weak base anion exchange resin containing tertiary amine functionality within a styrene-divinylbenzene matrix.

The effluent from the ion exchange bed was freeze dried and yielded 35.2 g. dry material analyzing as follows:

|   | G. |
|---|---|
| Crude Protein | 31 |
| Ash | 3.1 |
| Unidentified Material | 1.1 |

Oil, not more than 0.002%.

The freeze-dried product was a pale salmon colored powder, completely soluble in water and with a pleasant shrimp-likek odor.

EXAMPLE II

A filtrate, prepared as in Steps 1–3 of Example I, was subjected to an ion exchange treatment using Amberlite IRA–68. After freeze drying the effluent, a pale pink powder, completely soluble in water and having a pleasant shrimp-like odor, was obtained. It analyzed as follows:

|   | Percent |
|---|---|
| Crude Protein | 88 |
| Ash | 8.1 |
| Oil | <0.001 |

EXAMPLE III

A Peruvian fish meal was prepared from anchovita. Two hundred fifty grams of the fish meal, 625 ml. of deionized water, 1.5 g. of butylated hydroxy anisole and 200 ml. of concentrated hydrochloric acid (38%) were admixed and heated at 120° C. at a steam pressure of 15 lbs./sq. inch for 60 minutes. The pH of the mass was less than 1.

The mixture was then cooled to room temperature and filtered through a No. 12 Whatman filter paper. The filter cake was washed with six portions of deionized water to a total of 1500 ml. All filtrates were combined including the filtrate from the initial filtration. The filter cake was dried and analyzed:

|   | G. |
|---|---|
| Oil | 26.2 |
| Crude Protein | 13.4 |

The combined filtrates were passed through a bed of Amberlite IRA–93 and the effluent freeze-dried; the freeze-dried product amounted to 152.7 grams and analyzed:

| Crue Protein | g | 128.7 |
|---|---|---|
| Ash | g | 21.0 |
| Unidentified Material | g | 4.0 |
| Oil | percent | 0.02 |

The product was a light brown hygroscopic powder, completely water soluble and had a pleasant bouillon-like aroma.

EXAMPLE IV

One hundred grams of Peruvian fish meal, 250 ml. of deionized water, 0.5 g. of butylated hydroxy anisole, and 65 ml. of concentrated hydrochloric acid (38%) were mixed and heated at 120° C. at a steam pressure of 15 lbs./sq. in. for 15 minutes. The pH of the mixture at the end of the cooking was 1. The mixture was cooled and filtered through Whatman No. 12 filter paper. The filter cake was washed with a total of 400 ml. of deionized water. The filtrate and the wash water were passed through a bed of Amberlite IRA–93 and the effluent freeze-dried; this product amounted to 50.4 g. and analyzed:

| Crude Protein | g | 37.6 |
|---|---|---|
| Ash | g | 8.2 |
| Unidentified Material | g | 4.6 |
| Oil | percent | 0.03 |

One hundred grams of Peruvian fish meal, 300 ml. of deionized water, 0.5 g. of butylated hydroxy anisole, and 45 ml. of concentrated sulfuric acid (95%) were mixed and heated at 120° C. at a steam pressure of 15 lbs./sq. in. for 15 minutes. The pH of the mixture at the end of the cooking was 1.25. The mixture was cooled and filtered through Whatman No. 12 filter paper. The filter cake was washed with a total of 605 ml. of deionized water. The filtrate and the wash water were immediately passed through a bed of Amberlite IRA–93 and the effluent was freeze-dried. The product amounted to 44 g., containing:

| Crude Protein | g | 37.8 |
|---|---|---|
| Ash | g | 5.4 |
| Unidentified Material | g | 0.77 |
| Oil | percent | 0.08 |

It should be understood that the term "fish" appearing in the claims hereafter means whole fish, fish residue or fish products except where noted otherwise.

I claim:

1. A process for recovering a water-soluble protein hydrolysate having a low oil content from fish material containing its natural oils, including the steps of:
   (a) digesting the fish material by hydrolysis in the presence of hydrochloric or sulfuric acid having a pH of about 1 at elevated temperature and pressure to yield an oil-containing aqueous protein hydrolysate;

(b) cooling the oil-containing aqueous protein hydrolysate to about room temperature; and (c) filtering the product of step (c) to separate solid and liquid material, thereby obtaining a filtrate consisting of an aqueous protein hydrolysate having an oil content of less than about 0.15 percent by weight.

2. The process of claim 1 wherein the elevated temperature is about 120° C. and the elevated pressure is about 15 p.s.i.g.

References Cited
UNITED STATES PATENTS

| | | | |
|---|---|---|---|
| 3,301,681 | 1/1967 | Kuster | 99—7 |
| 2,857,278 | 10/1958 | Milner | 99—14 |
| 2,589,287 | 3/1952 | Ryan et al. | 99—111 |

A. LOUIS MONACELL, Primary Examiner

R. A. YONCOSKIE, Assistant Examiner

U.S. Cl. X.R.

426—212, 364